United States Patent Office  2,957,862
Patented Oct. 25, 1960

2,957,862

METALLIFEROUS TRIAZINE MONOAZO-DYESTUFFS

Henri Riat, Arlesheim, and Fritz Oesterlein, Basel, Switzerland, assignors to Ciba Limited, Basel, Switzerland No Drawing. Filed Oct. 6, 1958, Ser. No. 765,283

Claims priority, application Switzerland Oct. 11, 1957

7 Claims. (Cl. 260—146)

This invention provides new metalliferous dyestuffs which contain one atom of chromium or cobalt bound in complex union to two monoazo-dyestuff molecules which contain at least two sulfonic acid groups and correspond to the formula (1)
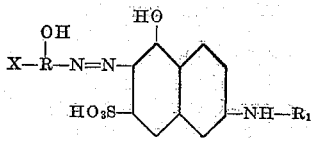

in which X represents a chlorine atom or a nitro group, R represents a benzene radical bound to the azo linkage in ortho-position to the hydroxyl group, and $R_1$ represents a benzene radical which advantageously contains a sulfonic acid group and contains an amino group bearing a halogenated 1:3:5-triazine radical. The invention provides more especially 1:2-complex chromium or cobalt compounds of monoazo-dyestuffs of the formula 2)
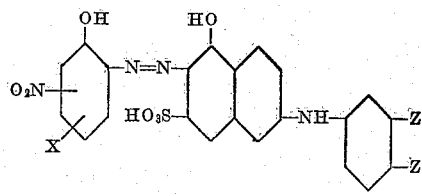

in which X represents a sulfonic acid group, an alkyl or alkoxy group of low molecular weight, a chlorine atom, an acylamino group, a sulfonic acid amide group, an alkanesulfonyl group, a nitro group or a hydrogen atom, and one Z represents a sulfonic acid group and the other Z a monochloro- or dichloro-1:3:5-triazine radical bound to the benzene radical through a nitrogen atom. As monochlorotriazine radicals there may be mentioned the 2-chloro-4-methyl or 2-chloro-4-phenyl-1:3:5-triazine radical and a radical of the formula (3)
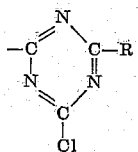

in which R represents an etherified hydroxyl or mercapto group or an amino group which may be substituted.

The complex heavy metal compounds of the invention can be made by customary methods, for example, the appropriate metal-free dyestuff of the Formula 1, which contains a triazine ring as defined above, may be treated with an agent yielding chromium or cobalt.

The complex heavy metal compounds can also be made by condensing a trihalogen-1:3:5-triazine, especially 2:4:6-trichloro-1:3:5-triazine, on the one hand, with a chromium or cobalt compound, containing two monoazo-dyestuff molecules bound in complex union with one atom of metal, of a monoazo-dyestuff which contains two or three sulfonic acid groups and corresponds to the formula (4)
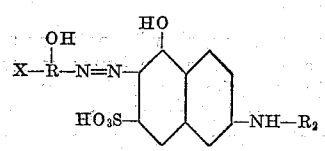

in which X represents a chlorine atom or a nitro group, R represents a benzene radical bound to the azo linkage in ortho-position to the hydroxyl group, and $R_2$ represents a benzene radical which advantageously contains a sulfonic acid group and contains an at most secondary amino group, in such manner that a dihalogen-triazine dyestuff is obtained, and, if desired, the latter dyestuff is condensed with ammonia, an organic mercapto or hydroxy-compound or with an organic at most secondary amine having no dyestuff character in such manner that the condensation product obtained contains a monohalogen-, more especially a monochloro-, 1:3:5-triazine radical. The new complex heavy metal compounds can also be made by condensing a 1:2-complex chromium or cobalt compound of a monoazo-dyestuff which contains two or three sulfonic acid groups, and corresponds to the Formula 4, with a 2:4-dihalogen-1:3:5-triazine, especially a 2:4-dichloro-triazine, for example, a dichlorotriazine of the formula (5)
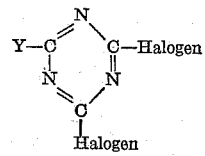

in which Y represents an etherified hydroxyl or mercapto group, a free amino group or the radical of an at most secondary amine bound through its amino group, the condensation being carried out in such manner that only one of the two halogen atoms of the triazine ring is exchanged.

The dihalogen-triazines of the Formula 5 can be made by methods in themselves known from cyanuric halides, such as cyanuric bromide or cyanuric chloride, for example, by reacting one mol of cyanuric chloride with one mol of a reactive organic mercapto or hydroxyl compound (for example a phenol or an alcohol), or of ammonia or an at most secondary, and advantageously primary, monamine having no dyestuff character. As such compounds there may be used, for example, aliphatic or aromatic mercapto or hydroxy-compounds, especially alcohols of low molecular weight and phenols, and also methylamine, ethylamine, iospropylamine, methoxyethylamine, methoxypropylamine, cyclohexylamine, dimethylamine, diethylamine, N-methylphenylamine, chlorethylamine, aniline, ethanolamines, piperidine, morpholine, aminocarbonic acid esters, aminoacetic acid ethyl esters, hydrazine, phenyl-hydrazine or ammonia, or amines containing groups imparting solubility in water, such as aminoethane sulfonic acid, N-methyl-aminoethane sulfonic acid, aminoacetic acid, ortho-, meta-, or para-aminobenzoic acid, aminosalicylic acids, amino-carboxybenzene sulfonic acid, ortho-, meta- or para-aminobenzene sulfonic acid or aminonaphthalene sulfonic acids.

The metalliferous dyestuffs to be condensed with the resulting primary cyanuric chloride condensation products of the Formula 5 or with cyanuric chloride can be made by methods in themselves known, for example, by treating a metallizable monoazo-dyestuff, which contains two or three sulfonic acid groups and corresponds to the formula

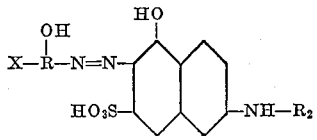

in which X represents a chlorine atom or a nitro group, R represents a benzene radical bound to the azo linkage in ortho-position to the hydroxyl group, and $R_2$ represents a benzene radical which contains an acylatable amino group and advantageously a sulfonic acid group, with an agent yielding chromium or cobalt in such a manner that a 2:1-complex-dyestuff metal compound is obtained.

For making such metallizable monoazo-dyestuffs a diazo component, for example, an ortho-hydroxydiazobenzene or -benzenesulfonic acid which contains a chlorine atom and/or a nitro group, such as a diazo compound of 4-nitro-2-amino-1-hydroxybenzene-6-sulfonic acid,
6-nitro-2-amino-1-hydroxybenzene-4-sulfonic acid,
4-nitro-2-amino-1-hydroxybenzene,
4-nitro-2-amino-6-acetylamino-1-hydroxybenzene,
4-chloro-6-nitro-2-amino-1-hydroxybenzene,
6-chloro-4-nitro-2-amino-1-hydroxybenzene,
4-chloro-2-amino-1-hydroxybenzene and 6-chloro-2-amino-1-hydroxybenzene-4-sulfonic acid,
4:6-dinitro-2-amino-1-hydroxybenzene,
4-methyl-6-nitro-2-amino-1-hydroxybenzene, and especially of 5-nitro-2-amino-1-hydroxybenzene, is coupled in an alkaline medium with a 2-amino-phenylamino-5-hydroxynaphthalene-7-sulfonic acid which advantageously contains a sulfonic acid group in the phenyl radical. As such coupling components there may be mentioned 2-(4'-aminophenyl-amino)-5-hydroxynaphthalene-7-sulfonic acid and especially 2-(4'-aminophenylamino)-5-hydroxynaphthalene-7:3'-disulfonic acid and 2-(3'-aminophenylamino)-5-hydroxynaphthalene-7:4'-disulfonic acid. These coupling components, especially that first mentioned, can be used in the form of their N-acetyl-derivatives for coupling. The acetyl group is then split off by alkaline hydrolysis, after coupling or even after metallization.

The conversion of the dyestuffs obtained from the above components into the complex heavy metal compounds used as starting materials in the process of this invention may be carried out while the dyestuffs are present in the mixture in which coupling takes place.

The treatment with the agent yielding chromium or cobalt is carried out in such manner that there is obtained a chromiferous or cobaltiferous dyestuff which contains one atom of chromium or cobalt bound in complex union to two monoazo-dyestuff molecules. Accordingly, the metallization is advantageously carried out with such an agent yielding chromium or cobalt and under such conditions that a complex chromium or cobalt compound of the aforesaid constitution is obtained. It is generally of advantage to use less than one atomic proportion and advantageously about one half atomic proportion of chromium or cobalt per molecular proportion of dyestuff and/or to carry out the metallization in a weakly acid or alkaline medium. Consequently, there are especially suitable for carrying out the process chromium or cobalt compounds which are stable in alkaline media, for example, complex chromium or cobalt compounds of aliphatic hydroxy-carboxylic acids or dicarboxylic acids and chromium compounds of aromatic ortho-hydroxy-carboxylic acids. As examples of aliphatic hydroxy-carboxylic acids or dicarboxylic acids there may be mentioned, inter alia, lactic acid, glycollic acid, citric acid, and especially tartaric acid, and among aromatic ortho-hydroxy-carboxylic acids there may be mentioned, for example, those of the benzene series such as 4-, 5- or 6-methyl-1-hydroxybenzene-2-carboxylic acid and especially 1-hydroxybenzene-2-carboxylic acid itself. As agents yielding cobalt, however, there may be used simple compounds of divalent cobalt, such as cobalt acetate or cobalt sulfate or, if desired, cobalt hydroxide.

The conversion of the dyestuffs into the complex chromium or cobalt compounds is advantageously carried out at a raised temperature under atmospheric or superatmospheric pressure, for example, at the boiling temperature of the reaction mixture, if desired, in the presence of a suitable addition, for example, in the presence of a salt of an organic acid or of a base, or an organic solvent or other agent assisting the formation of complexes.

A unitary dyestuff may be subjected to the metallization. It is also possible, and in many cases of advantage, for example, for producing tints of various shades, to metallize a mixture of two different metallizable monoazo-dyestuffs as defined above.

The condensation of these complex heavy metal compounds of monoazo-dyestuffs with cyanuric chloride or a dihalogen-triazine of the Formula 5 is advantageously carried out in the presence of an agent capable of binding acid, such as sodium acetate, sodium hydroxide or sodium carbonate, and under conditions such that the finished product contains one exchangeable halogen atom per triazine nucleus, that is to say, for example, in the presence of an organic solvent or at a relatively low temperature in an aqueous medium.

The condensation with the aforesaid 2:4-dihalogen-1:3:5-triazines, for example, a dihalogen-triazine of the Formula 5, may, as stated above, also be carried out before the dyestuff is metallized, provided that the dyestuff used can be metallized sufficiently easily to avoid attacking the halogen atom remaining in the metal-free dyestuff condensation product.

The dyestuffs of this invention are advantageously isolated at a low temperature by salting out and filtration. The isolated dyestuffs may be dried, if desired, after the addition of an extender or a stabilizer. Advantageously the drying is carried out at not too high a temperature and under reduced pressure. By spray drying the whole mixture in which the dyestuff is produced it is in some cases possible to obtain dry preparations, that is to say, without first isolating the dyestuff. In this manner valuable new dry dyestuff preparations are obtained which are suitable for preparing stock solutions or dyebaths and, if desired, printing pastes.

The new dyestuffs of this invention are valuable complex dyestuff-metal compounds which are suitable for dyeing or printing a very wide variety of materials, such as superpolyamide fibers, silk, wool or leather, but especially polyhydroxylated fibrous materials such as cellulosic materials and also synthetic fibers, for example, of regenerated cellulose or natural materials, for example, cellulose, linen or above all cotton. They are suitable for dyeing by the so-called direct dyeing method from a long liquor and from an aqueous alkaline bath which may contain a high concentration of a salt, and above all by the printing or pad dyeing methods, in which the dyestuff is applied to the goods to be dyed by printing or pad-dyeing and is fixed thereon by means of an agent capable of binding acid and, if desired, by the action of heat.

The dyeings produced with the new dyestuffs on cellulosic fibers are generally distinguished by their good fastness to light and above all by their excellent fastness to washing. Furthermore, the dyeings generally have the same appearance in artificial light as in daylight.

The following examples illustrate the invention, the parts and percentages being by weight unless otherwise stated and the relationship of parts by weight to parts by volume being the same as that of the kilogram to the liter:

Example 1

57.5 parts of the monoazo-dyestuff obtained by coupling diazotized 5-nitro-2-amino-1-hydroxybenzene with 2-(4'-aminophenyl)-amino-5-hydroxynaphthalene - 7:3'-disulfonic acid in an aqueous alkaline solution, are neutralized with sodium carbonate in 500 parts of water, and there are added 50 parts of a 2 N-solution of sodium hydroxide and 120 parts of a solution of sodium chromosalicylate having a chromium content of 2.6%. After boiling the mixture for 4 hours under reflux the chroming is finished.

For making the dichlorotriazine derivative the solution of the 2:1-complex chromium compound so obtained is adjusted with dilute hydrochloric acid to a pH value of 7. At 0-5° C. there are added, while stirring well, 18.5 parts of cyanuric chloride dissolved in a small amount of acetone, and the pH-value is maintained at 7 by the dropwise addition of about 50 parts by volume of a 2 N-solution sodium hydroxide.

After the addition of 5 parts of monosodium phosphate and 5 parts of disodium phosphate, the dye-stuff is precipitated with sodium chloride, filtered off, and dried in vacuo at 30-40° C.

The new dyestuff is obtained as a grey-black powder which dyes cellulose fibers by the method described in Example 5 greenish blue tints of good fastness to washing and light.

Example 2

The solution of the 2:1-chromium compound obtained as described in the first paragraph of Example 1 is adjusted with dilute hydrochloric acid to a pH value of 7. There are then added at 0-5° C., while stirring well, 18.5 parts of cyanuric chloride dissolved in a small amount of acetone, and the pH-value is kept constant at about 7 by the dropwise addition of about 50 parts of a 2 N-solution of sodium hydroxide.

In order to exchange the second chlorine atom for an amino group, there are added to the resulting reaction mixture 125 parts of a 2 N-solution of ammonia, and the whole is stirred for 3 hours at 35-40° C. After cooling the mixture, the dyestuff formed is precipitated by the addition of sodium chloride, then filtered off and dried in vacuo at 50-60° C.

The new dyestuff yields on cellulose fibers by the method described in Example 5 greenish blue tints of good fastness to washing and light.

Example 3

57.5 parts of the monoazo-dyestuff, obtained by coupling diazotized 5-nitro-2-amino-1-hydroxybenzene in an alkaline medium with 2-(4'-aminophenyl)-amino-5-hydroxynaphthalene-7:3'-disulfonic acid, are dissolved in 500 parts of water at 70° C. with the addition of 100 parts by volume of a 2 N-solution of sodium hydroxide, and there are added 100 parts of a cobalt sulfate solution having a cobalt content of 3.25%. After stirring the mixture for ½ hour at 70-80° C. the formation of the cobalt compound is terminated.

The amino-monochloro- and dichloro-triazine compounds are made by methods analogous to those described in Examples 1 and 2.

By the method described in Example 4 the new dyestuff dyes cellulose fibers reddish blackish blue tints of good fastness to washing and light.

Example 4

The dichlorotriazine derivative prepared in known manner from 17.3 parts of 1-aminobenzene-3-sulfonic acid and 18.5 parts of cyanuric chloride are mixed at 40° C. with a neutral solution of the 1:2-chromium complex, which has been prepared in the manner described in Example 1 from 57.5 parts of the dyestuff of the formula

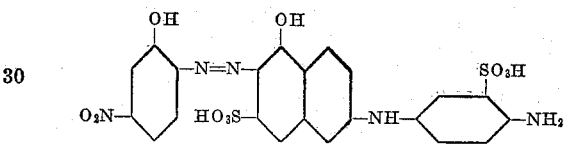

and the reaction mixture is neutralized by the gradual addition of a dilute solution of sodium hydroxide. When the condensation is finished the dyestuff is salted out, filtered off and dried. It dyes cotton greenish blue tints.

By using, instead of the aforesaid dichlorotriazine derivative, 18 parts of 2-methoxy-4:6-dichloro-1:3:5-triazine or the corresponding quantity of 2-phenoxy-4:6-dichloro-1:3:5-triazine, and carrying out the condensation, advantageously in aqueous acetone, as described above, there are obtained dyestuffs having similar properties.

Further dyestuffs of the invention can be made by the methods described in the foregoing examples by coupling the diazo-compounds of the amines named in column I of the following table with the coupling components named in column II, converting the resulting monoazo-dyestuffs into the metal complexes (of which the metal is named in column III), and condensing the complex metal compounds with cyanuric chloride and an amine named in column IV. In column V are given the tints of the dyeings or prints produced on cotton with several dyestuffs.

| I | II | III | IV | V |
|---|---|---|---|---|
| 6-Nitro-2-Aminophenol 4-Sulfonic acid | 2-(4'-Aminophenyl)-amino-5-hydroxynaphthalene-7:3'-disulfonic acid. | Co | Ammonia | blue-violet. |
| Do | do | Cr | do | blue. |
| 4-Chlor-2-aminophenol | do | Co | do | brown violet. |
| Do | do | Cr | do | blue. |
| 4:6-Dinitro-2-amino phenol | do | Co | do | violet blue. |
| Do | do | Cr | do | greenish blue. |
| Do | do | Cr | 1-Aminobenzene-4-sulfonic acid. | Do. |
| 6-Nitro-4-methyl-2-aminophenol | do | Cr | Ammonia | Do. |
| 6-Chlor-2-aminophenol-4-sulfonic acid | do | Cr | do | blue. |
| Do | do | Co | do | brown violet. |
| Do | do | Co | 1-Aminobenzene-3-sulfonic acid. | Do. |
| 5-Nitro-2-aminophenol | do | Cr | 2-Aminoethanol | greenish blue. |
| Do | do | Cr | 1-Aminobenzene-2-sulfonic acid. | Do. |
| Do | do | Cr | 1-Aminobenzene-2:5-disulfonic acid. | Do. |
| Do | do | Cr | 2-Aminonaphthalene-6-sulfonic acid. | Do. |

| I | II | III | IV | V |
|---|---|---|---|---|
| 5-Nitro-2-aminophenol | 2-(4'-Aminophenyl)-amino-5-hydroxy-naphthalene-7:3'-disulfonic acid. | Co | Aniline | violetish blue. |
| Do | do | Co | 2-Methoxyethylamine | Do. |
| Do | do | Cr | 2-Methoxypropylamine | greenish blue. |
| Do | do | Cr | Isopropanolamine | Do. |
| Do | do | Cr | Morpholine | Do. |
| Do | do | Cr | 4-Methyl-1-aminobenzene-2-sulfonic acid. | Do. |
| Do | do | Cr | Ethylamine | Do. |
| Do | do | Cr | 1-Aminobenzene-2-carboxylic acid. | Do. |
| Do | 2-(3'-Aminophenyl)-amino-5-hydroxy-naphthalene-7:4'-disulfonic acid. | Cr | 1-Aminobenzene-3-sulfonic acid. | blue. |
| Do | do | Cr | Ammonia | Do. |
| 4-Nitro-2-aminophenol | 2-(4'-Aminophenyl)-amino-5-hydroxy-naphthalene-7:3'-disulfonic acid. | Co | do | dull violet. |
| Do | do | Cr | do | blue. |
| 5-Nitro-4-chlor-2-aminophenol | do | Cr | 4-Amino-1-hydroxybenzene-2-carboxylic acid. | greenish blue. |
| Do | do | Cr | Aminoethanesulfonic acid | Do. |
| 6-Chlor-4-nitro-2-aminophenol | do | Cr | 1-Aminobenzene-4-sulfonic acid. | Do. |
| Do | do | Cr | Cyclohexylamine | Do. |
| 6-Acetylamino-4-nitro-2-aminophenol | do | Cr | Ammonia | Do. |
| 4-Chlor-2-aminophenol-5-sulfonic acid amide | do | Cr | do | Do. |
| 6-Nitro-2-aminophenol-4-sulfonic acid | 2-(4'-Aminophenyl)-amino-5-hydroxy-naphthalene-7-sulfonic acid. | Cr | do | blue. |
| 4-Chlor-2-aminophenol-6-sulfonic acid | do | Cr | 1-Aminobenzene-3-sulfonic acid. | Do. |

In preparing the two dyestuffs last mentioned in the above table the said 2-(4'-aminophenylamino)-5-hydroxy-naphthalene-7-sulfonic acid is used in the form of its N-acetyl derivative, and after coupling or after the metallization the acetyl group is split off by alkaline hydrolysis.

*Example 5*

2 parts of the dyestuff obtained as described in Example 1 are dissolved in 100 parts of water. A regenerated cellulose fabric of staple fibers is impregnated with the resulting solution, and squeezed until it retains 75% of its weight of solution, and is then dried.

The fabric is then impregnated with an aqueous solution at 20° C., which contains, per liter, 10 grams of sodium hydroxide and 300 grams of sodium chloride, and the fabric is squeezed to a weight increase of 75%, the dyeing is steamed for 60 minutes at 100–101° C., rinsed, soaped for ¼ hour in a boiling solution of 0.3% strength of a non-ionic detergent, rinsed and dried. There is obtained a fast greenish blue dyeing.

By using 2 parts of the dyestuff obtained as described in Example 2 there is likewise obtained a fast greenish blue dyeing.

What is claimed is:

1. A complex metal compound which contains one atom of one of the metals selected from the group consisting of chromium and cobalt bound in complex union to two monoazo-dyestuff molecules which contain at least two sulfonic acid groups and correspond to the formula

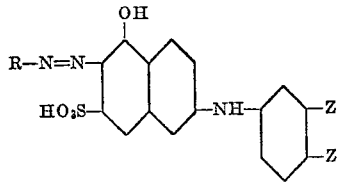

wherein R is a member selected from the group consisting of 1-hydroxy-nitrobenzene, 1-hydroxy-chlorobenzene, 1-hydroxy-nitro-chlorobenzene, 1-hydroxy-nitrotoluene, 1-hydroxy-nitrobenzenesulfonic acid and 1-hydroxychlorobenzenesulfonic acid radicals which are bound to the azo linkage in 2-position and are unsubstituted in 3-position, one Z represents a member of the group consisting of —SO₃H and hydrogen, and the other Z represents a member selected from the group consisting of a 2:4-dichloro-1:3:5-triazine radical bound by an amino group in its 6-position, a 2-amino-4-chloro-1:3:5-triazine radical bound by an amino group in its 6-position, a 2-alkoxy-4-chloro-1:3:5-triazine radical bound by an amino group in the 6-position and a 2-phenoxy-4-chloro-1:3:5-triazine radical bound by an amino group in its 6-position.

2. A complex chromium compound containing one atom of chromium in complex union to substantially two molecules of a monoazo-dyestuff of the formula

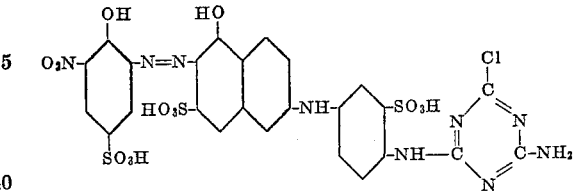

3. The complex chromium compound containing one atom of chromium in complex union to substantially two molecules of a monoazo-dyestuff of the formula

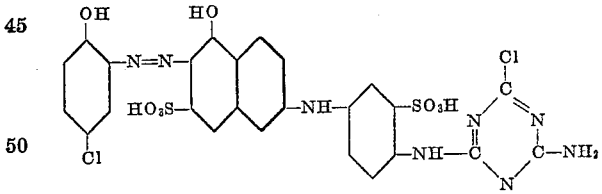

4. The complex chromium compound containing one atom of chromium in complex union to substantially two molecules of a monoazo-dyestuff of the formula

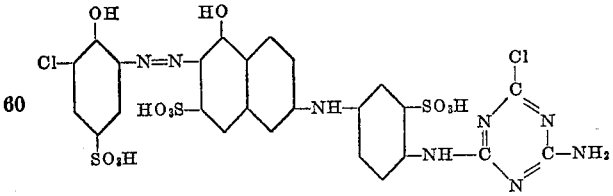

5. The complex chromium compound containing one atom of chromium in complex union to substantially two molecules of a monoazo-dyestuff of the formula

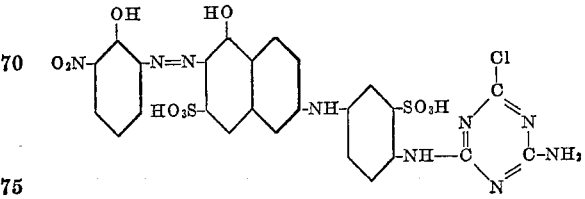

6. The complex cobalt compound containing one atom of cobalt in complex union to substantially two molecules of a monoazo-dyestuff of the formula
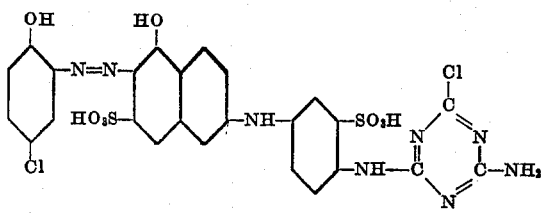
7. The complex chromium compound containing one atom of chromium in complex union to substantially two molecules of a monoazo dyestuff of the formula
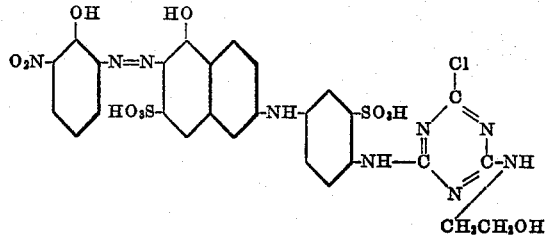
No references cited.

UNITED STATES PATENT OFFICE
CERTIFICATE OF CORRECTION

Patent No. 2,957,862            October 25, 1960

Henri Riat et al.

It is hereby certified that error appears in the above numbered patent requiring correction and that the said Letters Patent should read as corrected below.

Column 8, lines 45 to 52, the right-hand portion of the formula should appear as shown below instead of as in the patent:

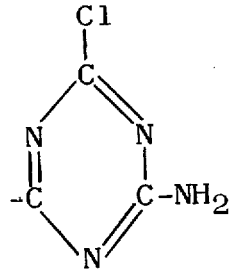

same column 8, lines 68 to 73, and column 10, lines 3 to 10, the left-hand portion of the formula, each occurrence, should appear as shown below instead of as in the patent:

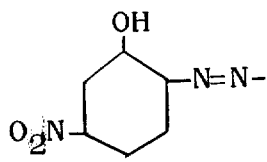

Signed and sealed this 24th day of April 1962.

(SEAL)
Attest:

ESTON G. JOHNSON
Attesting Officer

DAVID L. LADD
Commissioner of Patents